US012686381B2

(12) United States Patent
Inoue

(10) Patent No.: US 12,686,381 B2
(45) Date of Patent: Jul. 21, 2026

(54) AUTOMATIC PARKING CONTROL DEVICE

(71) Applicant: TOYOTA JIDOSHA KABUSHIKI KAISHA, Toyota (JP)

(72) Inventor: Kota Inoue, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 55 days.

(21) Appl. No.: 18/627,539

(22) Filed: Apr. 5, 2024

(65) Prior Publication Data

US 2024/0336257 A1     Oct. 10, 2024

(30) Foreign Application Priority Data

Apr. 6, 2023     (JP) ................................. 2023-062396

(51) Int. Cl.
| | |
|---|---|
| *B60W 30/06* | (2006.01) |
| *B60W 50/14* | (2020.01) |
| *B60W 60/00* | (2020.01) |

(52) U.S. Cl.
CPC ........... *B60W 30/06* (2013.01); *B60W 50/14* (2013.01); *B60W 60/001* (2020.02); *B60W 60/0053* (2020.02); *B60W 2540/00* (2013.01)

(58) Field of Classification Search
CPC ............. B60W 30/06; B60W 60/0053; B60W 60/001; B60W 50/14; B60W 2540/00; B62D 15/028; B62D 15/0285
USPC .......................................................... 701/23
See application file for complete search history.

(56) References Cited

U.S. PATENT DOCUMENTS

| | | | |
|---|---|---|---|
| 9,522,661 | B2 | 12/2016 | Inoue et al. |
| 9,604,638 | B2 | 3/2017 | Kiyokawa et al. |
| 9,738,276 | B2 | 8/2017 | Kiyokawa et al. |
| 9,828,028 | B2 | 11/2017 | Ishijima et al. |
| 9,836,658 | B2 | 12/2017 | Kiyokawa et al. |
| 9,875,655 | B2 | 1/2018 | Kiyokawa et al. |
| 10,031,227 | B2 | 7/2018 | Kiyokawa et al. |
| 10,150,486 | B2 | 12/2018 | Hoshino et al. |
| 10,239,520 | B2 | 3/2019 | Tomozawa et al. |
| 10,377,416 | B2 | 8/2019 | Fukukawa et al. |
| 2010/0049401 | A1* | 2/2010 | Watanabe ................. B60R 1/23 701/41 |
| 2018/0257665 | A1* | 9/2018 | Sannodo ............. B60W 50/082 |
| 2020/0055514 | A1* | 2/2020 | Tsuge .................. B60W 30/095 |
| 2020/0282975 | A1* | 9/2020 | Minase ................. B60L 15/30 |
| 2020/0298839 | A1* | 9/2020 | Inoue .................... B60W 10/20 |
| 2020/0398824 | A1* | 12/2020 | Tsujino ............. B60W 60/0025 |
| 2020/0406888 | A1* | 12/2020 | Hamai .................. B60W 10/20 |
| 2021/0107507 | A1* | 4/2021 | Matsunaga ........... B60W 30/06 |
| 2022/0297677 | A1* | 9/2022 | Morimoto ............. B60W 30/06 |

FOREIGN PATENT DOCUMENTS

| | | | | |
|---|---|---|---|---|
| JP | 2018-135028 A | 8/2018 | | |
| KR | 20170100091 A | * | 9/2017 | ............ B60W 50/14 |

* cited by examiner

*Primary Examiner* — Daniel M. Robert
*Assistant Examiner* — Helen Li
(74) *Attorney, Agent, or Firm* — Finnegan, Henderson, Farabow, Garrett and Dunner, LLP

(57) ABSTRACT
The processor 162 of ECU160 is configured to park a vehicle at a designated position by a semi-automatic parking control in which the driver only operates a shift lever, and to temporarily interrupt the automatic parking control when the driver operates the shift lever to a parking range at the time of turning-back of the steering wheel during the automatic parking control.

3 Claims, 3 Drawing Sheets

FIG. 1

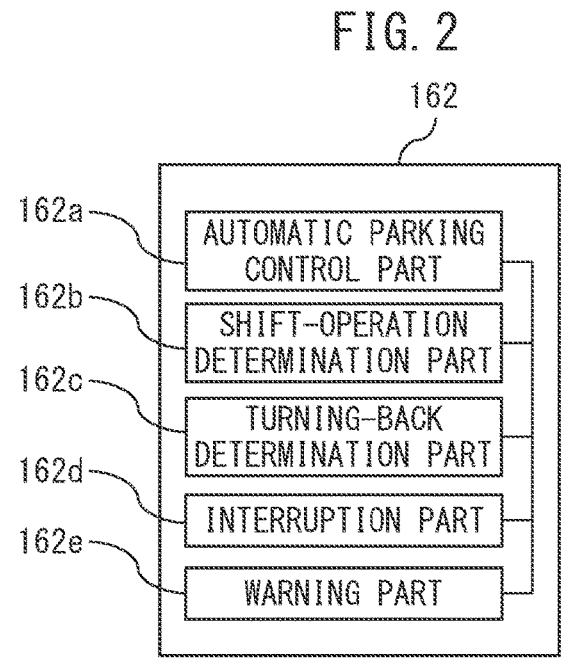

IN-VEHICLE CAMERA — 105

160

ECU

162 — PROCESSOR

164 — MEMORIES

166 — COMMUNICATION INTERFACE

170 — DISPLAY DEVICE

180 — SPEAKER

190 — INPUT DEVICE

195

110 — POSITIONING INFORMATION RECEIVER

VEHICLE CONTROL EQUIPMENT — 120

ENGINE — 120a

MOTOR — 120b

FRICTIONAL BRAKE — 120c

STEERING DEVICE — 120d

TRANSMISSION — 120e

SHIFT LEVER — 130

SENSORS — 140

162a — AUTOMATIC PARKING CONTROL PART

162b — SHIFT-OPERATION DETERMINATION PART

162c — TURNING-BACK DETERMINATION PART

162d — INTERRUPTION PART

162e — WARNING PART

AUTOMATIC PARKING CONTROL DEVICE

FIELD

The present invention relates to an automatic parking control device.

BACKGROUND

Conventionally, JP-A-2018-135028 describes the following. A target route from the assistance start position to the target parking position is set on the basis of the nearest approach setting distance in which the approach between the host vehicle and the obstacle is allowed. When the driver stops the own vehicle at a stage when the distance between the own vehicle and the obstacle does not reach the closest set distance, the distance between the own vehicle and the obstacle at that time is set as the value of the closest set distance. Then, the target route is corrected based on the newly set closest setting distance.

SUMMARY

Technical Problem

In semi-automatic parking in which the driver performs only the shift operation manually and the other operations are performed automatically by the vehicle, there is a possibility that the driver erroneously operates the shift lever. For example, if the shift lever is operated in the parking range when the vehicle turns over, it is determined that the vehicle is parked at a desired position on the vehicle side, and the automatic parking control may end. In this case, since the parking is not actually completed, the driver needs to redo the setting of the automatic parking from 1.

In the technique described in the above-mentioned patent document, it is not taken into consideration that the automatic parking is ended due to the erroneous operation of the shift lever by the driver. Therefore, it is not possible to correctly determine whether the shift operation by the user is an erroneous operation or an intended operation, and there is room for improvement.

In view of the above problems, an object of the present disclosure is to prevent the automatic parking control from being ended due to an erroneous operation of the shift lever in the semi-automatic parking control in which the driver performs only the operation of the shift lever.

Solution to Problem

The gist of the present disclosure is as follows.

(1) An automatic parking control device comprising a processor, wherein the processor is configured to park the vehicle at a designated position by a semi-automatic parking control in which the driver only operates the shift lever, and to temporarily interrupt the automatic parking control when the driver operates the shift lever to the parking range at the time of turning-back the steering wheel during the automatic parking control.

(2) The automatic parking control device according to (1) above, wherein the processor is configured to generate a warning to the driver to operate the shift lever to a drive range or a reverse range when the automatic parking control is temporarily interrupted.

(3) The automatic parking control device according to (1) or (2) above, wherein the processor is configured to resume the automatic parking control when the shift lever is operated to a drive range or a reverse range in a state where the automatic parking control is temporarily interrupted.

Advantageous Effects of Invention

According to the present disclosure, in the semi-automatic parking control in which the driver performs only the operation of the shift lever, it is possible to prevent the automatic parking control from being ended due to the erroneous operation of the shift lever.

BRIEF DESCRIPTION OF DRAWINGS

FIG. 1 is a schematic diagram showing a configuration of a vehicle control system mounted on the vehicle.

FIG. 2 is a schematic diagram showing a functional block of a processor of ECU provided in the vehicle.

DESCRIPTION OF EMBODIMENTS

Figure 3:
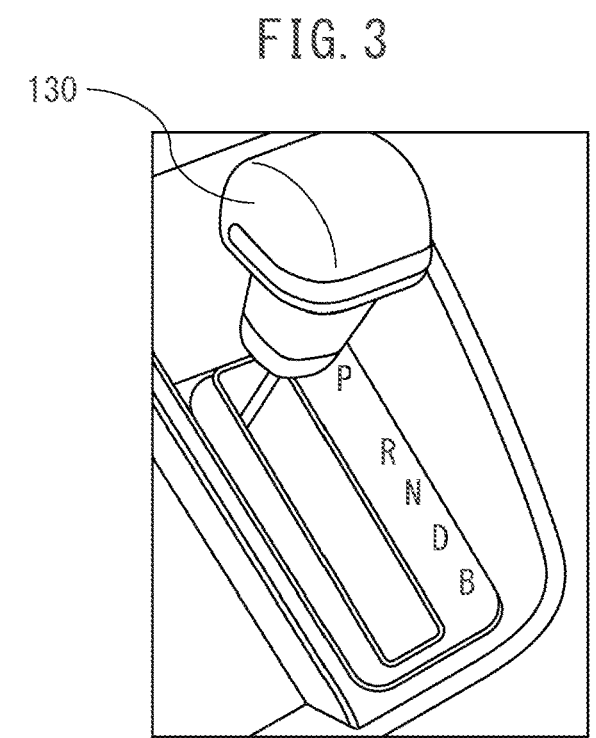
FIG. 3 is a schematic diagram showing an appearance of the shift lever.

Hereinafter, some embodiments of the present invention will be described with reference to the drawings. However, these descriptions are intended to be merely exemplary of the preferred embodiments of the present invention and are not intended to limit the present invention to such specific embodiments. In the following description, the same reference numerals are given to the same constituent elements.

FIG. 1 is a schematic diagram illustrating a configuration of a vehicle control system mounted on a vehicle 100. The vehicle control system controls the vehicle 100 by autonomous driving. In particular, the vehicle control system according to the present embodiment is a system that enables semi-automatic parking when the vehicle is placed in a garage as part of automatic driving. In the semi-automatic parking, the driver of the vehicle 100 manually performs only the shift operation. Other operations, i.e., operations such as starting and stopping, acceleration and deceleration, pivot (steering), and the like, are automatically performed by the vehicle 100.

The vehicle control system includes an in-vehicle camera 105, a positioning information receiver 110, a vehicle control equipment 120, a shift lever 130, one or more sensors 140, an ECU (Electronic Control Unit) 160, a display device 170, a speaker 180, an input device 190, and a storage device 195. These are communicatively connected via an in-vehicle networking compliant with standards such as Controller Area Network (CAN).

The in-vehicle camera 105 includes a two-dimensional detector such as a CCD or a C-MOS, and an imaging optical system. The in-vehicle camera 105 captures an image of the surroundings of the vehicle 100 (e.g., the front, side, or rear of the vehicle) and generates an image representing the surroundings of the vehicle 100.

The positioning information receiver 110 acquires positioning information indicating a current position and an attitude of the vehicle 100. For example, the positioning information receiver 110 may be a GPS (Global Positioning System) receiver.

The vehicle control equipment 120 is a variety of devices related to vehicle control. The vehicle control equipment 120 includes an engine 120a and a motor 120b as driving sources for driving the vehicle, a frictional brake 120c, a steering device 120d, and a transmission 120c.

The shift lever 130 switches the shift position of the transmission 120e in accordance with the operation of the driver. The shift position of the transmission 120e is switched by, for example, an actuator driven in response to an electric signal by operating the shift lever 130 by a so-called shift-by-wire method.

The one or more sensors 140 include sensors for monitoring the surroundings of the vehicle 100, e.g., sensors such as Lidar (Light Detection and Ranging), Radar.

ECU160 includes a processor 162, memories 164, and a communication interface 166. The processor 162 includes one or more CPU and peripheral circuitry thereof. The processor 162 provides a predetermined function by executing a computer program executably loaded in a work area of the memory 164. The memory 164 includes, for example, a volatile semiconductor memory and a non-volatile semiconductor memory. The communication interface 166 has interface circuitry for connecting ECU160 to an in-vehicle network or to an external communication network.

The display device 170 includes, for example, a liquid crystal display (LCD). The display device 170 is provided in a meter panel or the vicinity of a dashboard or the like inside the vehicle, and displays a warning toward the driver. Similarly, the speaker 180 is provided inside the vehicle, and outputs a warning to the driver by voice.

The input device 190 is a device to which operation information by a driver is input. The input device 190 includes a button, a touch sensor, and the like. In the input device 190, an instruction to start the automatic parking control, information specifying the parking position of the vehicle 100 (parking position specifying information), and the like are input by an operation of the driver.

The storage device 195 includes, for example, a hard disk device or an optical recording medium and an access device thereof, and stores various kinds of information such as a high-definition map.

FIG. 2 is a schematic diagram illustrating functional blocks of the processor 162 of ECU160 provided in the vehicle 100. The processor 162 is an aspect of an automatic parking control device according to the present disclosure. The processor 162 includes an automatic parking control part 162a, a shift-operation determination part 162b, a turning-back determination part 162c, an interruption part 162d, and a warning part 162c. These parts included in the processor 162 are, for example, functional modules realized by a computer program running on the processor 162. That is, each of these parts included in the processor 162 includes a processor 162 and a program (software) for causing the processor to function.

The automatic parking control part 162a of the processor 162 parks the vehicle 100 at the designated position by the semi-automatic parking control in which the driver only operate the shift lever 130. Specifically, the automatic parking control part 162a controls the vehicle control equipment 120 to park the vehicle 100 at a position designated by the parking position designation information. This control is performed based on parking position designation information, an image representing the surroundings of the vehicle 100, information detected by the sensor 140 for monitoring the surroundings of the vehicle 100, and the like. At this time, the vehicle control equipment 120 may control the vehicle control equipment 120 with reference to the positioning information, the position of each parking place in the parking lot recorded in the high-definition map, and the like.

After the automatic parking control is started, the automatic parking control part 162a ends the automatic parking control when the shift lever 130 is operated to the P range. Further, the automatic parking control part 162a resumes the automatic parking control when the shift lever 130 is operated to the D range or the R range while the automatic parking control is temporarily interrupted.

The shift operation determination part 162b of the processor 162 determines the operation of the shift lever 130 by the driver of the vehicle 100. FIG. 3 is a schematic view illustrating an external appearance of the shift lever 130. As shown in FIG. 3, the shift lever 130, in order from the front side, P range, R range, N range, D range, the shift position corresponding to each of the B range is defined. When the driver operates the shift lever 130 to the position of the P range, the shift position of the transmission 120c is set to the P range. Similarly, when the driver operates the shift lever 130 to a position in another range, the shift position of the transmission 120c is set to the range operated by the driver.

The P (parking) range is a shift position when the vehicle is parked or when the vehicle is started. The R (reverse) range is a shift position when the vehicle is moved backward. The D (drive) range is a shift position when the vehicle travels normally. The N (neutral) range is a shift position that blocks the transmission of the driving force to the wheels. The B (brake) range is a shift position set when the vehicle is braked.

Figure 4:
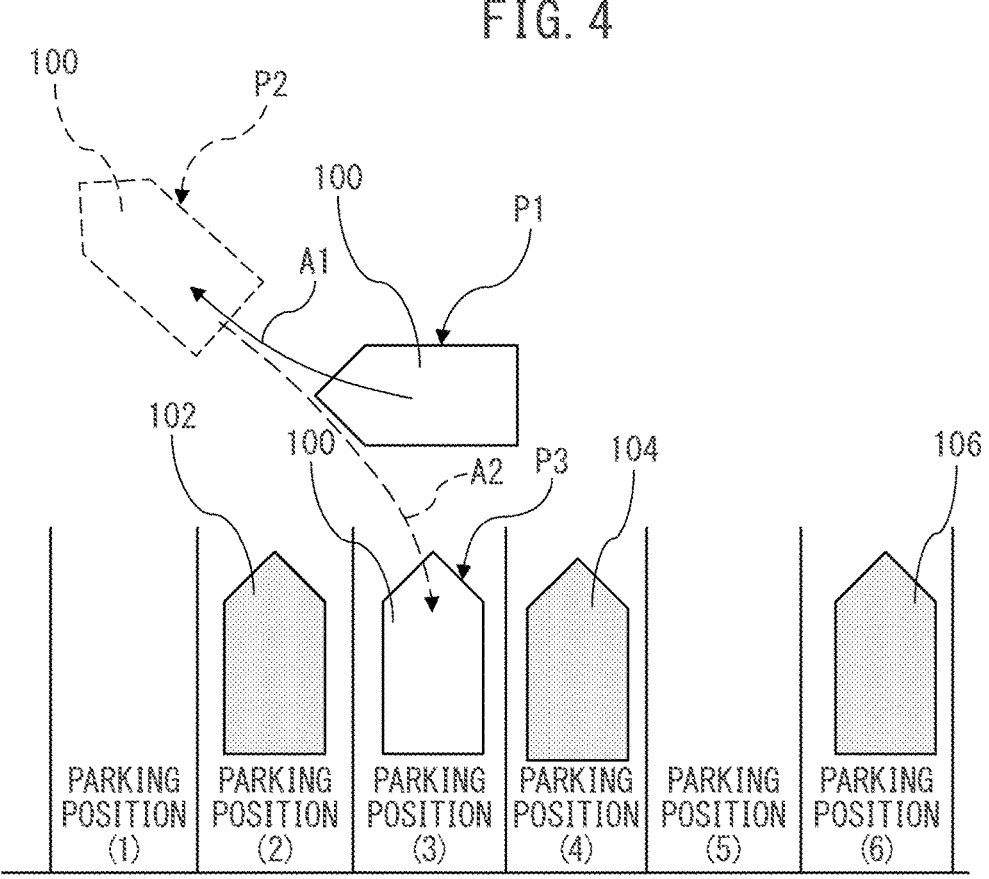
FIG. 4 is a schematic view of a state in which a vehicle is automatically parked in a parking lot as viewed from above.

FIG. 4 is a schematic diagram of a state in which the vehicle 100 is automatically parked in the parking lot 10 as viewed from above. FIG. 4 shows a state in which the vehicle 100 parks at the parking position (3) in the parking lot 10 such as a store. When an instruction to start the automatic parking control is input to the input device 190 at the automatic parking start position P1, the automatic parking control is started. Note that the instruction to start the automatic parking control may include parking position designation information for designating the parking position (3). When the automated parking control is started, the vehicle 100 advance in A1 of the direction of arrow for heading, and are stopped at the turning-back position P2. Thereafter, the vehicle 100 turn-back the steering wheel back and retreat (back) toward the parking position (3) in A2 of the arrow, and are stopped at the storage completion position P3 within the frame of the parking position (3).

In the turning-back position P2, the driver operates the shift lever 130 to switch the shift position from the D range to the R range. Further, in the warehousing completion position P3, the driver switches the shift position from the R range to the P range, and the automated parking control ends. Therefore, in the turning-back position P2, a display prompting the driver to switch from the D range to the R range is displayed on the display device 170. Further, in the turning-back position P2, the speaker 180 outputs a message of switching from the D range to the R range by sound. Similarly, in the storage completion position P3, an indication or a sound prompting the driver to switch from the R range to the P range is outputted. While the vehicle 100 moves from the position P1 to P3, only the shift lever 130 is operated by the driver. Other operations of the vehicle 100 other than the shift-position switching are automatically performed under the control of the automatic parking control part 162a.

Note that FIG. 4 illustrates an example of backward parking in which the vehicle 100 moves backward to enter the parking position (3). When the vehicle 100 is in forward parking in the forward direction and enters the parking position (3), the vehicle 100 moves backward in the arrow A1 direction in FIG. 4 and moves forward in the arrow A2 direction. Therefore, in the turning-back position P2, the driver switches the shift position from the R range to the D range.

As shown in FIG. 3, in the general shift lever 130, the P range, the R range, the N range, and the D range are arranged in this order from the front. Therefore, when the driver switches from the D range to the R range in the turning-back position P2, the shift lever 130 may accidentally pass the position of the R range and reach the position of the P range. In this case, if it is determined that the automatic parking control is to be terminated, the parking is not actually completed. Therefore, when the driver inputs an instruction to start the automatic parking control to the input device 190, the automatic parking control is started. It should be noted that it is necessary to input the instruction to start the automatic parking control and the parking position designation information to the input device 190 again to redo the setting of the automatic parking from 1.

On the other hand, when the shift lever 130 is operated to the P range at the storage completion position P3 (or immediately before), the driver intends to terminate the automated parking. Therefore, there is no problem even if a determination is made to end the automatic parking control. Similarly, when the shift lever 130 is operated in the P range immediately after the automatic parking starting position P1, it is considered that the driver intends to terminate the automatic parking for some reason. For example, the driver may be considered to intend to terminate the automatic parking due to the presence of an obstacle on the path. Therefore, there is no problem even if a determination is made to end the automatic parking control. As described above, the intention of switching to the P range by the driver is different depending on the position of the vehicle 100. Immediately after the position P1 or at the position P3, the intent is to terminate the automated parking. On the other hand, in the position P2, it is recognized that switching to the P range is an erroneous operation of the drivers.

In the present embodiment, the behavior of the driver with respect to the operation to the P range is divided according to the scene of the automatic parking. When it is determined that the switching to the P range is an erroneous operation of the driver, the automatic parking control is temporarily interrupted without ending the automatic parking control.

Therefore, the turning-back determination part 162c of the processor 162 determines whether or not the vehicle 100 is located at the turning-back point of the steering wheel during the automated parking control of the vehicle 100. For example, in the exemplary embodiment of FIG. 4, the turning-back determination part 162c determines whether or not the vehicle 100 are located at the turning-back position P2.

Then, the interruption part 162d of the processor 162 temporarily interrupts the automatic parking control when the driver operates the shift lever 130 to the P range at the time of turning-back the steering wheel during the automatic parking control. This prevents the automatic parking from being completed due to an erroneous operation of the driver.

On the other hand, the interruption part 162d does not temporarily interrupt the automatic parking control when the driver operates the shift lever 130 to the P range at a timing other than turning-back the steering wheel during the automatic parking control. The interruption part 162d does not temporarily interrupt the automated parking control, for example, immediately after the parking starting position P1 or when the drivers operate the shift lever 130 to the P range at the storage completion position P3. As described above, the automatic parking control part 162a terminates the automatic parking control.

When the automatic parking control is temporarily interrupted by the interruption part 162d, the warning part 162e of the processor 162 generates a warning to the driver to operate the shift lever 130 to the D range (in the case of forward parking) or the R range (in the case of reverse parking). Specifically, when the driver erroneously operates the shift lever 130 in the P range in the turning-back position P2 of FIG. 4, the warning part 162e displays a warning. For example, the warning part 162e causes the display device 170 to display a warning such as "Please operate the shift lever to the R range!". Alternatively, the warning part 162e causes the speaker 180 to output a similar warning by sound. Thus, the driver that has received the warning can recognize that the operation of the shift lever 130 in the P range is an erroneous operation.

When the driver that has received the warning operates the shift lever 130 to the D range or the R range, the interrupted automatic parking control is resumed. As described above, since the automatic parking control is not terminated even if there is an erroneous operation of the driver, it is not necessary for the driver to redo the setting of the automatic parking from 1. Therefore, the automatic parking control can be resumed by operating the D range or the R range.

Figure 5:
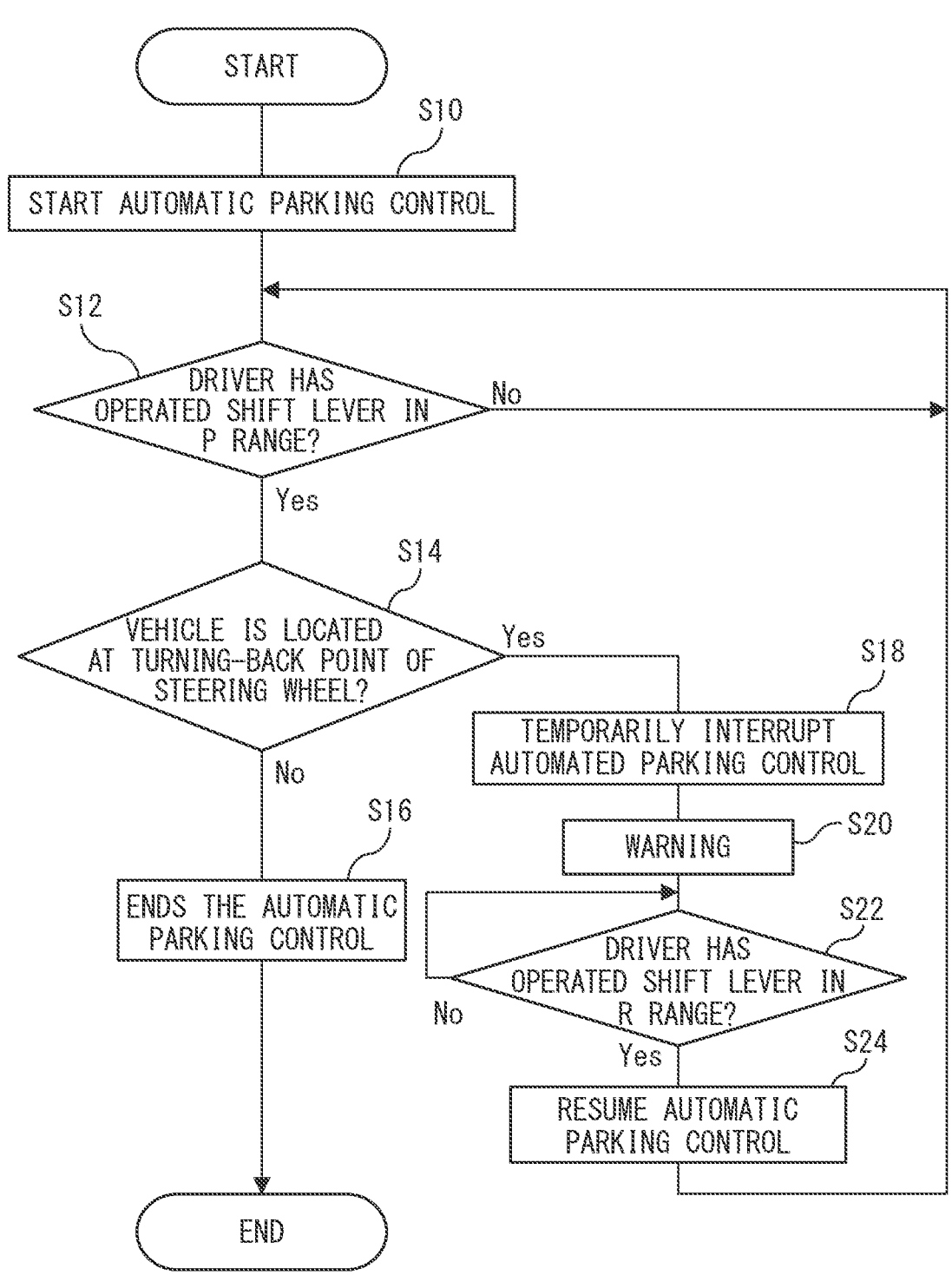
FIG. 5 is a flow chart showing a process which the processor of ECU of the vehicle performs.

Next, a process performed by the processor 162 in ECU160 of the vehicle 100 will be described based on the flow chart of FIG. 5. First, when an instruction to start the automatic parking control is input to the input device 190 by the drivers, the automatic parking control part 162a starts the automatic parking control (S10). Next, the shift operation determination part 162b determines whether or not the driver has operated the shift lever 130 in the P range (S12). When it is determined that the vehicle is operated in the P range in the step S12, the turning-back determination part 162c determines whether or not the vehicle 100 is located at the turning-back point of the steering wheel (S14). If it is not located at the turning-back point in the stepwise S14, the automatic parking control part 162a ends the automatic parking control (S16).

If the vehicle 100 is located at the turning-back point of the steering wheel in S14, the interruption part 162d temporarily interrupts the automated parking control (S18). Next, the warning part 162e generates a warning to the driver to operate the shift lever 130 in the R range (the D range in the case of forward parking) (S20).

Next, the shift operation determination part 162b determines whether or not the driver has operated the shift lever 130 in the R range (S22). When it is determined that the vehicle has been operated in the R range in the step S12, the automatic parking control part 162a resumes the automatic parking control (S24). If it is not determined that S22 has operated the R range, the process waits at S22.

After S24, S12 is returned, and the auto parking control is continued. In addition, when it is determined in S12 that the driver is not operating in the P range, the control returns to S12, and the auto parking control is continued.

As described above, according to the present embodiment, when the driver operates the shift lever to the P range at the time of turning-back the steering wheel during the automatic parking control, the automatic parking control is temporarily interrupted. Therefore, it is possible to prevent the automatic parking from being completed due to an erroneous operation of the driver. Since the control for the operation of the driver is appropriately changed according to the scene of the automatic parking, safety and convenience can be ensured.

The invention claimed is:

1. An automatic parking control device comprising a processor, wherein the processor is configured to:

park a vehicle at a designated position by a semi-automatic parking control in which the driver only operates a shift lever, determine whether or not the vehicle is located at a turning-back point of the steering wheel, and temporarily interrupt the automatic parking control when the driver operates the shift lever to a parking range when the vehicle is located at the turning-back point of the steering wheel during the automatic parking control.

2. The automatic parking control device according to claim 1, wherein the processor is configured to generate a warning to the driver to operate the shift lever to a drive range or a reverse range when the automatic parking control is temporarily interrupted.

3. The automatic parking control device according to claim 1, wherein the processor is configured to resume the automatic parking control when the shift lever is operated to a drive range or a reverse range in a state where the automatic parking control is temporarily interrupted.

\* \* \* \* \*